Oct. 29, 1968 D. G. BILLS ET AL 3,407,991
APPARATUS FOR ION PUMPING AND PRESSURE MEASUREMENT
Filed July 5, 1966 4 Sheets-Sheet 1

INVENTORS
DANIEL G. BILLS
KEITH A. WARREN

BY Cushman, Darby & Cushman
ATTORNEYS

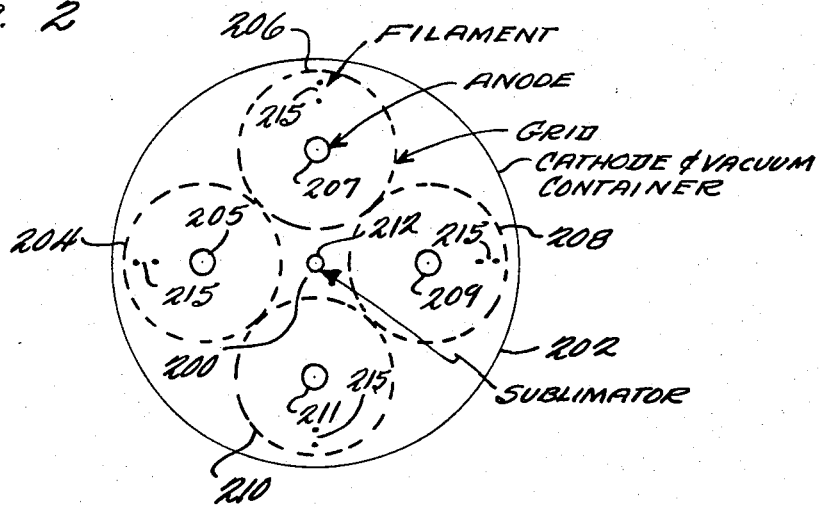
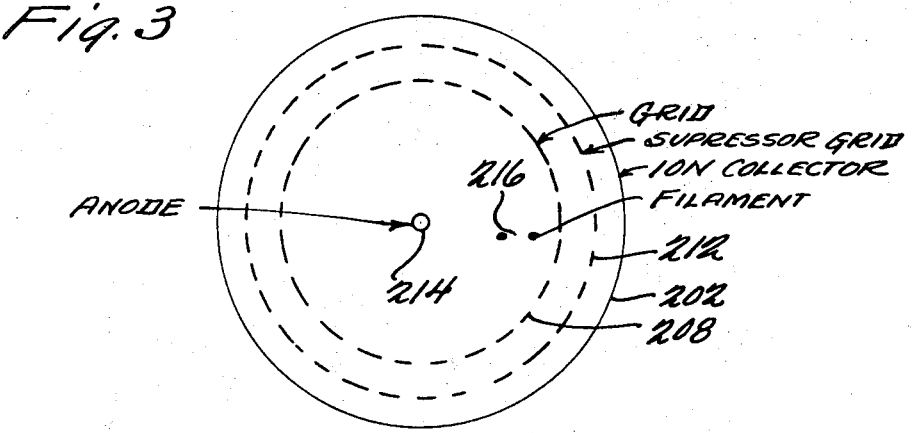

Oct. 29, 1968  D. G. BILLS ET AL  3,407,991
APPARATUS FOR ION PUMPING AND PRESSURE MEASUREMENT
Filed July 5, 1966  4 Sheets-Sheet 3

INVENTORS
DANIEL G. BILLS
KEITH A. WARREN
BY Cushman, Darby & Cushman
ATTORNEYS

United States Patent Office 3,407,991
Patented Oct. 29, 1968

3,407,991
APPARATUS FOR ION PUMPING AND
PRESSURE MEASUREMENT
Daniel G. Bills and Keith A. Warren, Boulder, Colo.,
assignors to Granville-Phillips Company, Boulder,
Colo., a corporation of Washington
Filed July 5, 1966, Ser. No. 562,823
21 Claims. (Cl. 230—69)

ABSTRACT OF THE DISCLOSURE

An electrostatic getter-ion pump comprises an outer cylindrical electrode enclosing a plurality of cells. Each cell has an open structured cylindrical electrode enclosing an elongate conductor. An injector within each cell emits electrons which ionize the gas. Each injector is disposed at an optimum location within its cell. Means are provided for symmetrically distributing gettering material on the inner wall of the outer cylindrical electrode, the ionized gas being electrostatically attracted to the wall and buried in the gettering material. Two electron injector emodiments are also disclosed which minimize the effect of the electrode presence on the pump performance.

---

This application contains subject matter disclosed in copending U.S. application Ser. No. 475,344, filed July 28, 1965, assigned to the assignee of the present application. The subject matter of application Ser. No. 475,344 not specifically disclosed in this application is incorporated by reference.

This invention relates to ion pumping and pressure measurement and, more specifically, to an improved method and apparatus for achieving a long total path length for angular momentum trapped, charged particles in an electrostatic field.

In the past decade, significant advances have been made in the technology of producing low pressures. One of the most important developments has been the "getter-ion pump" which, in many applications, has proved superior to other types such as diffusion pumps or mechanical pumps employing vanes or impellers.

A getter-ion pump, unlike more conventional pumping devices, has no moving parts, contains no fluids such as oil or mercury, and does not eject the pumped gases into the outside atmosphere; but instead, it operates in a manner such that electrons are released from a suitable source and caused to move in a region within the pump until they strike gas molecules with sufficient energy to create ions or are captured on an electrode. The gas ions thus created are accelerated by appropriate electric fields and collide with suitable surfaces where they become buried. Simultaneously, getter material is sputtered, evaporated, or otherwise deposited on certain interior surfaces so that the buried ions are further covered. The fresh deposit of getter material reacts with chemically active gases such as, for example $O_2$, $N_2$, and $H_2$ without requiring ion formation. The chemcial compounds thus formed remain trapped on the interior surfaces of the pump.

The greater the distance that an electron can be made to travel before being captured on an electrode, the greater the probability that it will suffer an ionizing collision with a gas molecule which can then be removed from the system. There have been two distinctly different approaches, each with several modifications, taught in the prior art as a means for producing the long electron path lengths necessary in efficient getter-ion pumping.

The first of these is the so-called "Evaporion" approach exemplified by U.S. Patents 2,850,225, 2,888,189, and 2,894,679, wherein the ionizing electrons are passed back and forth through grids. Even a 95% open grid will intercept essentially all of the electrons after only a few dozen traversals, hence, the resulting electron path is quite short.

The second has become known as the "Sputter-ion" approach (U.S. Patent 2,993,638) which utilizes magnetic and electric fields to confine the electrons. These devices are a great improvement over the "Evaporion" devices because the electrons do not traverse grids, therefore they always circulate in free space. To obtain high pumping speeds, however, multiple cell geometries must be employed and these cells have to be placed between the pole faces of permanent magnets to obtain the required strong magnetic fields. Thus, in these devices, it is difficult and costly to maintain high gas conductance to the cells and still get the cells into the narrow magnet gaps provided by the present-day permanent magnets. In addition, these magnets are costly, bulky, heavy, and produce unwanted stray fields. Because of this tight geometry, it is almost impossible to evaporate getter material uniformly into the discharge volume to enhance pumping or to cover previously buried ions. Sputtering is used in such devices to provide fresh getter material, but the sputtering must be so intense that it tends to uncover previously buried gas. A third way of producing long electron path lengths was suggested by J. R. Pierce in his book, "Theory and Design of Electron Beams" (Van Nostrand Co., Inc., New York, 1949) pp. 33–34. The author describes the confinement of electrons by the conservation of angular momentum in purely electrostatic fields without the use of grids or magnetic fields. In section 4.2 of Pierce's book, "Radial Electric Fields; Conservation of Angular Momentum," he writes:

"Consider a field in which the potential is a function of radius only. Such a field might be a charge-free field, or it might be one in which there is an appreciable charge due to moving electrons (space charge). As $F_\theta$ is zero in such a field, from $$rF_\theta = \frac{d}{dt}(mr^2\dot\theta)$$

$r^2\dot\theta =$ constant

Suppose, for example, electrons leave the interior of a cylindrical cathode with initial velocities (perhaps thermal velocities) and are attracted toward a small cylindrical anode . . ."

Pierce goes on to show that if the electrons are injected with suitable angular momenta they can be made to miss the central anode.

Elementary energy considerations show that if the electrons emerge from a source at a potential intermediate between the cathode and anode, they will have insufficient energy to reach the cathode. Furthermore, they lack the energy necessary to escape through the ends of the cylindrical diode regardless of whether end caps are provided on the cathode or not. Thus, the electrons are constrained to circulate continuously about the anode until they either strike the electron source from which they emerged or suffer a loss in angular momentum because of field asymmetries or because they have collided with a gas molecule. Gas ions thus created are accelerated to the cathode by the radial field where they are captured as in any getter-ion pump.

It thus becomes apparent that the problem of producing an efficient electron trapping device incorporating such an arrangement requires that one devise a method of injecting electrons with a suitable angular momentum and energy and with the electron injection device so placed that it does not appreciably disturb the radial field, and thus allows as many electrons as possible to be trapped.

Prior art U.S. Patent No. 3,118,077, utilizes an electron gun to direct a well defined beam of electrons tangentially into the annular space between the cathode and anode, but, such an arrangement suffers from several serious disadvantages. To begin with, the electrons all emerge from the electron gun with very nearly the same angular momentum and energy and, hence, follow the same path, except for a slight space charge spreading. Also, the entire electron path lies in essentially the same plane, resulting in all of the electrons being concentrated in a very small volume of the device. This produces a space charge build-up which seriously limits the amount of circulating charge which can be stably contained between the anode and cathode. Because the electron gun lies in the plane of the orbiting electrons, they collide with the gun structure after only a few excursions around the anode.

It has now been found that these and other problems can be eliminated in accordance with the teaching of the copending U.S. application (Ser. No. 475,344 mentioned hereinbefore) by injecting the electrons into the annular space between the cathode and anode so that their paths essentially fill the space and so that they are urged axially away from the emitting source structure. The electrons are all injected with essentially the same energy but with a continuous range of angular momenta ranging from values so large that some electrons just miss collision with the cathode to values so small that a few electrons immediately collide with the anode. In addition, the electrons are injected into a region of the electrostatic field where an axial component of the field exists. Such an axial field component is present in the region where the anode is terminated short of the cathode or where an end cap covers the end of the cathode. Electrons thus injected tend to orbit about the anode in an infinite number of distinct paths. With each electron acquiring an axial component of velocity, these electrons tend to follow rosette-shaped helical orbits away from the emitter source. At the opposite end of the device from the emitter, the field remains cylindrically symmetric and the electrons are reflected without net change in their angular momentum about the anode and drift back along said anode toward the emitter. Having returned again to the emitter end of the unit, some electrons will make another similar traverse of the field region. In this way the average path length for an electron can be made hundreds or thousands of times longer than the path lengths generated in the prior art devices and the quantity of circulating charge approaches the theoretical maximum, i.e., the charge on the cylindrical capacitor represented by the anode-cathode assembly.

Also, according to the teaching of the copending U.S. application Ser. No. 475,344, an open grid electrode is placed between the cathode and anode, concentric with the anode, and held at a potential intermediate between said anode and cathode. The electrons are injected into the annular space between the grid electrode and anode with an energy and angular momentum distribution selected such that the electrons are trapped and constrained to orbit about the anode. Obviously, the open grid electrode now functions in the same manner as the cathode in the previously described diode structure as far as the orbiting electrons are concerned. The orbiting electrons travel through very long paths and are quite effective in exciting or ionizing gas molecules that are present between the anode and grid electrode. The positive ions created in this manner are accelerated radially out of the grid-anode region by the electrostatic field. In addition, they are further accelerated by the electrostatic field between the grid and cathode to the cathode where they are buried. The cathode is made of a gettering material such as titanium, or, preferably, is fabricated from a metal like stainless steel onto which is continuously or intermittently evaporated a coating of getter material.

In the diode structure without the grid, ions formed far from the anode acquire insufficient energy to bury themselves in the cathode; however, in the triode device, all of the ions produced in the grid-anode region can be accelerated to sufficiently high energy to bury themselves in the cathode.

Another advantage is realized through the use of the triode configuration. It has been determined experimentally that the electron space-charge around the anode is unstable at electron densities where operation of the device is efficient. Some electrons are, therefore, able to acquire sufficient additional energy from space-charge oscillations, collisions, or otherwise to escape to the cathode in the diode device. Thus, the current to the cathode is composed of both ions and electrons and this net current is not a measure of the gas pressure alone in the diode structure. In the diode device, on the other hand, any electrons which leave the grid-anode region are turned back by the electrostatic field between the grid and the cathode; therefore, the current to the cathode is composed solely of positive ions and this current value becomes a true measure of the pressure in the grid-anode region, thus enabling the pump to measure the gas pressure within it.

Still another advantage is realized through the use of the triode configuration. By placing the grid closer to the anode, the grid-anode capacitance is increased with a resulting increase in the electrical charge stored on the grid-anode capacitor. Hence, the amount of possible circulating electron charge is increased with a resulting increase in the amount of ion production. This result can be achieved without decreasing the cross-section of the cathode and hence without reducing the gas conductance into the cathode.

In accordance with the teachings of the present invention, it has been found that the performance of the triode device can be improved by disposing a plurality of grid-anode structures within a single cathode. This results in increased pumping speeds of both active and inert gases as will become apparent from the detailed description of the invention which follows.

Thus, it is an object of this invention to employ multiple electrostatic cells to increase the pumping speed of inert gases while simultaneously maintaining a high pumping speed for active gases in an electrostatic getter-ion pump.

It is another object of this invention to facilitate the location of a sublimator in a multiple-cell, electrostatic, getter-ion pump.

It is another object of this invention to provide improved designs for electron injectors for use in an electrostatic, getter-ion pump, the improved injectors only slightly disturbing the symmetry of the electrostatic field and presenting a very small physical target for the orbiting electrons.

It is another object of this invention to provide an improved ion vacuum gauge, the output of which is accurately related to number of gas particles in the measured space.

Still other objects will be in part apparent and in part pointed out specifically hereinafter in connection with the description of the drawings that follows, and in which:

FIGURE 2 is a diagrammatic representation of an illustrative embodiment of the present invention employing multiple cells;

FIGURE 3 is a diagrammatic representation of a modified embodiment of the invention which is employed as an ionization vacuum gauge;

Figure 1:
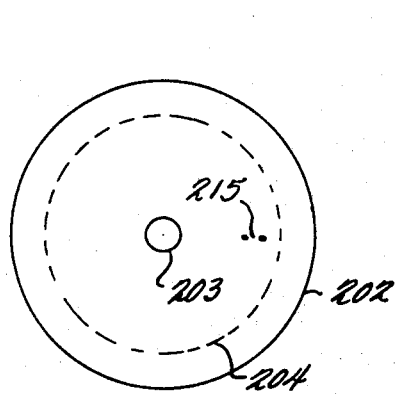
FIGURE 1 is a diagrammatic representation of a single cell getter-ion pump, various embodiments of which are described in detail in copending U.S. application Ser. No. 475,344.

Referring to FIGURE 1, there is diagrammatically illustrated a single-cell structure as described in copending U.S. application Ser. No. 475,344. This structure comprises a cathode 202, an anode 203, and a third electrode or grid 204, where each of these elements may be coaxial cylinders. The emitter or filament 215 is located between the anode and grid.

Because of the closer proximity of the grid electrode 204 to the anode 203 than the proximity of cathode 202 thereto, the capacitance between said grid and anode is considerably larger than the capacitance that would exist in the system if it contained only the anode and cathode without the grid. It follows, therefore, that the electrical charge that can be stored on the grid-anode capacitor is substantially greater than could be stored on the cathode-anode capacitor without the grid. The circulating electron charge that can orbit in a stable condition about the anode is limited to approximately 50 to 75% of the bound charge on the capacitor; therefore, it follows that the grid-anode capacitor offers an opportunity for greatly increasing the number of circulating electrons that can orbit the anode with the attendant increase in ion pumping effect.

Quite obviously, this same increase in ion pumping capacity could be realized by decreasing the diameter of the cathode 202 to that of the grid electrode 204; however, to do so would bring about a very serious decrease in active gas pumping capacity. It is equally obvious that the anode diameter could be increased to increase the capacitance but this would seriously decrease the ion pumping effect by shortening the electron path and could also decrease the gas conductance of the device by obstructing the flow path. It must be remembered that a pump of this type is, in essence, two pumps having different functions and not always consistent. Specifically, these units must pump the chemically-active gases such as, for example, oxygen, nitrogen and hydrogen; but, in addition be able to rid the system of the chemically-inactive gases like xenon, krypton, neon, argon and helium. The active gases present no particular problem as they are readily trapped on a surface coated with a suitable gettering material such as titanium, with which they combine chemically. The atoms of the inactive gases, on the other hand, must be ionized by electron bombardment to produce positive ions which can then be driven into appropriate collecting surfaces and buried under a layer of freshly deposited getter material.

The inconsistencies arise because of the considerably greater volume of active gases that must be handled by the system in comparison to the inactive gases. A pump designed to handle large volumes of active gas, for the reasons aforementioned, will have a small ion pumping capability due to the reduced capacitance of a system having a cathode spaced far away from the anode. Conversely, an increase in ion pumping capacity resulting from moving the cathode in closer to the anode decreases the active gas conductance of the cathode as the cube of its diameter. This, obviously is a serious limitation of the diode-type getter-ion pumps in which the solution involves a compromise between the active and inactive gas pumping capacities with both suffering a substantial decrease.

It is now possible through the use of the triode configuration shown in FIGURE 1 to retain the large diameter cathode 202 so necessary to a high active gas conductance and, at the same time, provide optimum inactive gas pumping capability through the use of high-capacitance grid-anode configurations. In this connection, it is important to point out that the radially-symmetric electrostatic field so necessary to the production of long average electron paths is achieved by using a hollow cylindrical grid electrode 204 encircling the anode in coaxial relation and is independent of the shape or location of the cathode relative to such a grid-anode system. Referring to FIGURE 2, a system is shown having increased ion-pumping capabilities with respect to FIGURE 1, while at the same time maintaining a high active-gas pumping rate. Thus, a plurality of small grid-anode subassemblies are grouped inside the cathode 202 and each of these smaller subassemblies have a higher capacitance as well as higher ion-pumping capability by reason of the close proximity of the grid electrode to the anode. In addition, each of these subassemblies requires its own separate injector assembly; however, a single source of gettering material located centrally with respect to the cathode insures an even deposition thereof. When multiple cells (where each cell corresponds to one of the grid-anode subassemblies) are used, as shown in FIGURE 2, a conduction heated sublimator may be used. Conduction heated sublimators generally employ the heating effects of current passed through the sublimator or through a material disposed adjacent to the sublimator. Although FIGURE 2 is a diagrammatic representation, it is not deemed necessary to specifically illustrate how the multiple cells would be incorporated into a single cathode structure since many various ways of doing this will occur to those having ordinary skill in this art.

The center region 200 of the cathode or outer electrode 202 between the grids or further electrodes 204, 206, 208, and 210 is at a relatively low potential and hence the center region 200 is a suitable region for installing a conduction heated sublimation device 212 which extends along the central axis of the cathode structure. Such a sublimator is described in a copending application Ser. No. 556,683 entitled Sublimation Device, filed on June 10, 1966 by Daniel G. Bills, Dean R. Denison, and Keith A. Warren and assiged to the assignee of the present application. Sublimator 212, located along the central axis, produces a highly uniform layer of fresh getter material on the inner surface of the cathode for active gas pumping. If conduction heated sublimators are installed in the center of the cathode in single diode devices, they must also serve as the anode and hence must operate at high potential. This makes operation and control most difficult. However, in the multiple cell approach, this problem is obviated. Thus, a structure is achieved where a high pumping rate of inactive gases is achieved because of the plurality of cells and a high active gas pumping rate is achieved because of the large surface area of gettering material deposited on the inner surface of the cathode 202.

Means for injecting the electrons into the grid-anode spaces existing in either FIGURES 1 or 2 will now be described with respect to FIGURES 5 and 6. The basic problem is to inject electrons with the proper energy and angular momentum without appreciably disturbing the necessary symmetry of the fields and without presenting a large physical target for the electrons.

Studies of the potential field surrounding a very fine wire have shown that the disturbance of the surrounding field by the presence of the wire becomes highly localized around the wire as the wire diameter is decreased. Conversely, the electric field around the fine wire is almost independent of the field in which the wire is immersed.

Thus, it has been concluded that a desirable emitter shape is a very fine wire of preferably rectangular or square or circular cross section and of length only sufficient to produce the required emission. It should be placed at one end of the diode or triode device between the anode and the next outer electrode. It should be placed so that its length is parallel to the anode and at a radial distance from the anode which can be determined from a study of a potential energy diagram such as in FIGURE 9, as will be done hereinafter. It should be placed at such a distance from the end of the diode or triode device that it is not predominately in the axial field near the end of the device. However, it should not be so far from the end of the device that it appreciably shortens the effective length of the device nor projects into the radial field region too far.

Emitters, which include filament supports and shield, generally present a relatively large geometrical cross section to orbiting electrons and further, the symmetrical potential distribution is disturbed. Two emitters will now be described with respect to FIGURES 5 and 6, respectively, where the effects of these problems are considerably reduced.

Figure 5:
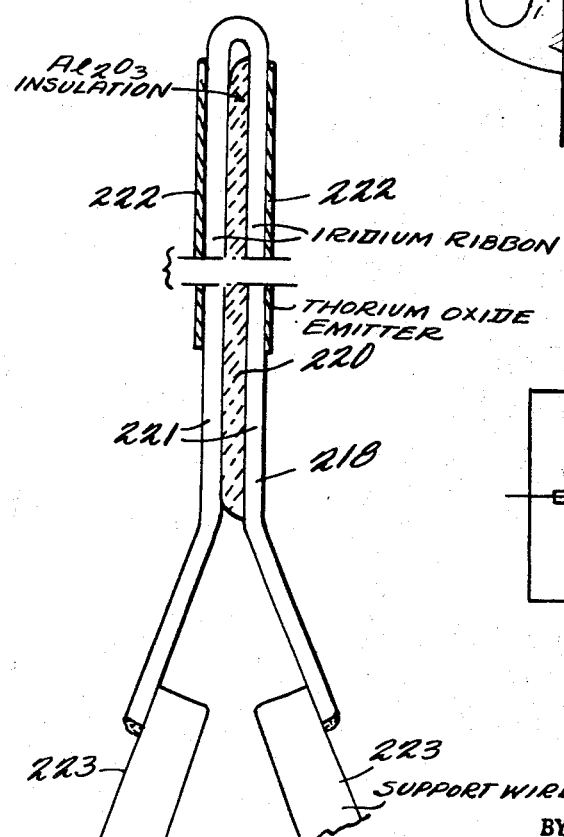
FIGURE 5 is an alternative embodiment of an injector which may be employed in the invention.

Referring to FIGURE 5, there is shown a thin ribbon 218 folded into a hairpin shape. The ribbon is preferably made of a refractory metal such as iridium and may may be approximately .002 in. thick and .006 in. wide depending on the application. The ribbon may be coated for about half its length on one side with approximately .002 in. thick coating 220 of high temperature insulating material such as aluminum oxide, beryllium oxide, or thorium oxide before it is folded. The ribbon is then folded over into the hairpin shape and the insulating coating is fired on. Thus, a filament structure is formed which has a cross section of only about .006 in. x .006 in. To prevent emission directly to the anode the two outer surfaces of the ribbon are coated with a very low work function material 222 such as thorium oxide or lanthanum hexaboride. The edges 221 of the metal ribbon 218 are not coated but left bare.

Figure 7:
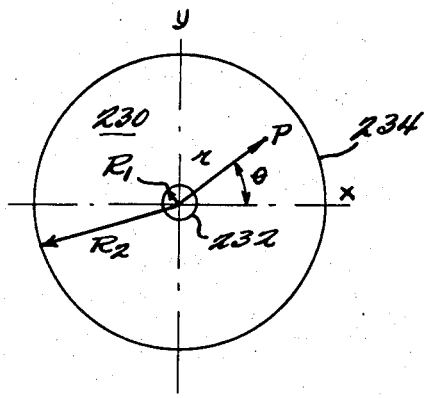
FIGURE 7 is a diagrammatic representation of a diode employed to illustrate the optimum location of an electron injector in a diode.

The emitter is positioned in the diode or triode device so that the low work function surfaces face in the $\theta$ direction as defined in FIGURE 7 and the filament is parallel to the anode. Thus when the filament is heated, electron emission will occur from the coated low work function surfaces at temperatures much too low to obtain emission from the edges of the metal ribbon. Because the emitting structure has such a small cross section, a very intense electric field surrounds the emitter in operation. Thus electrons emitted in the $\theta$ direction acquire a considerable $\theta$ velocity and thus a considerable angular momentum before they have moved out of the almost pure $\theta$ directed electric field they find themselves in when emitted. Thus, directed electron velocities are obtained from a structure which has a total cross section no larger than the wire emitter which has been commonly used.

Because the emitter has a hairpin shape, expansion is not a problem and springs which could increase its physical size and disturb the symmetrical potential are not required. Further, because the low work function coating does not extend down the entire length of the metal ribbon, the larger metal support rods 223 are well out of the emission region and cause no problems.

Figure 6:
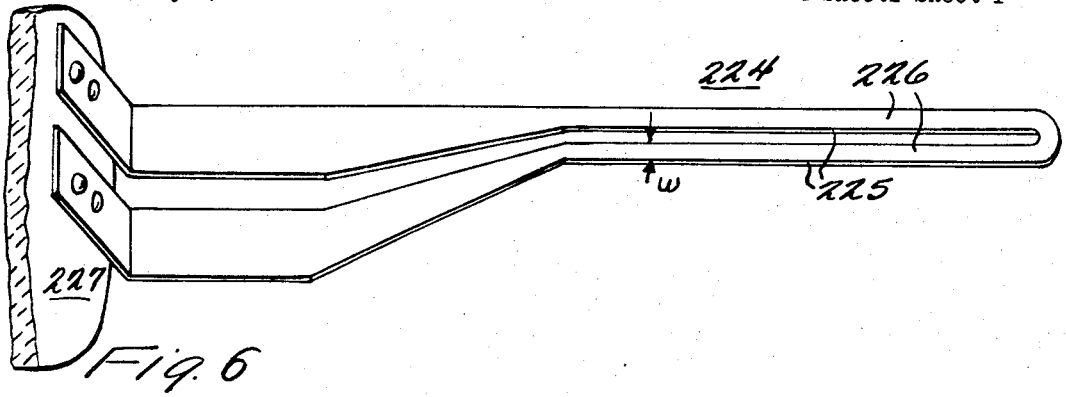
FIGURE 6 is the preferred embodiment of an injector which may be employed in the invention.

The preferable electron emitter design is shown in FIGURE 6, which is a perspective view thereof. The electron emitter 224 is preferably electrochemically etched from a sheet of metal such as pure tungsten. The sheet may be .004 in. thick, for example and is coated with a photoresist and then exposed to light through a suitable mask to define the area which will be etched away. This filament may be mounted on a wafer 227 of aluminum oxide for example. The wafer provides mechanical support and electrical insulation for the filament. This simple one-piece strip filament provides copious emission over a large range of angular momenta but with negligible emission directly to the anode when the surface 226 in the plane of the drawing is directed in the approximate $\theta$ direction. This surface is substantially larger in surface area than the edge 225 of the emitter. Thus, the plane of the sheet lies in the radial direction. For a dimension $\omega$ of .012 inch and a thickness of .004 in., the emission in the $\theta$ direction is six times as large as the emission in the radial direction.

The filament also produces a negligibly small perturbation of the cylindrically symmetrical potential distribution between the anode and grid. Therefore, it does not appreciably decrease the path lengths of the orbiting electrons.

Because the filament is eventually bent at right angles at the base 227 to form the supports, unequal thermal expansion of either leg of the filament is automatically compensated by the deflection of the supports. Thus take up springs ordinarily required on high temperature filaments are not required with this design.

The grid diameter to anode diameter ratio has been studied and it has been found that there is a considerable ion pumping speed dependence on this ratio. This ratio has been determined to be approximately 15.4. Thus, if the grid diameter is approximately 1.44 inch, the anode diameter would be approximately 3/32 inch.

The ion pumping speed is also influenced by the grid wire diameter and pitch of the grid wires. The optimum grid wire diameter is approximately .013 in. and the optimum pitch is approximately .25 in. when the grid diameter is 1.44 in. and the anode diameter is 3/32 in.

The placement of the filament also influences maximum ion pumping. When the filament or electron emitter is spaced 19/32 inch from the center of the anode, an argon ion pumping speed per cell of 10.6 liters/sec. is obtained for above given dimensions of anode and grid diameters. If the filament is moved 1/32 inch closer to the anode, the pumping speed decreases to 8.1 liter/sec. per cell. Further, the axial position of the tip of the electron emitter relative to the anode shield or termination (to be described in detail hereinafter with respect to FIGURE 10) also influences the ion pumping speed. The optimum position of the tip of the electron emitter is .500 inch from the end of the anode termination for a radial distance of emitter of .595 inch. Changing the axial position of the electron emitter by ±.025 inch decreases the argon ion pumping speed by 25%. It will be seen hereinafter that there is no one optimum axial position of the emitter tip for all radial distances from the anode. Rather, for each distance from the anode shield, where a component of axial electric field exists, there is a corresponding optimum radial distance from the anode for locating the emitter.

It can be seen that both the radial and axial placement of the electron injector is critical. In order to understand the reason for this criticalness, it is necessary to develop some of the theory of electron motion in a cylindrical diode. This development will also establish criteria for selection of proper electron energy and angular momenta to maximize the total electron path so that the ionization will be maximum at any given pressure, the total path being defined as the product of $n_i$, the number of orbiting electrons, and $\bar{l}$, the average path length of an electron between electrodes. The following development will be for a diode, it being understood that the volume between the anode and grid of a triode device can be treated in an analogous manner.

Consider the motion of an electron in a long cylindrically concentric diode 230 as shown in FIGURE 7 where the center conductor 232 is the anode. Let $\varphi(r)$ be the potential at a point P distance $r$ from the center of the anode which is at a positive potential with respect to the cathode 234. The electrical force on an electron at point P is $$F(r) = \frac{eV_a}{r \ln(R_2/R_1)} \qquad (1)$$

where $r$ is the radial distance to some arbitrary point in meters.

$R_1$ is the radius of the anode in meters.

$R_2$ is the radius of the cathode in meters.
$V_a$ equals the potential of anode relative to the cathode in volts.
$e$ is the electron charge in Coulombs.

The equations of motion (see, for example, H. Goldstein, Classical Mechanics, Addison-Wesley, Reading, Mass., 1950, pages 58 ff. for a more complete treatment of motion in a central force field) for the electron in cylindrical coordinates are $$F(r) = m\ddot{r} - mr\dot{\theta}^2 \qquad (2)$$

$$0 = mr\ddot{\theta} + 2m\dot{r}\dot{\theta} \qquad (3)$$

where the number of dots over a symbol corresponds to the number of differentiations with respect to time. If Eq. 3 is multiplied by $r$ and rewritten as Eq. 4, it is obvious that the angular momentum, $L$, of the electron is conserved.

$$\frac{d}{dt}(mr^2\dot{\theta}) = \frac{dL}{dt} = 0 \qquad (4)$$

Upon substituting for $\dot{\theta}$ in terms of $L$ in Eq. 2 one obtains $$\mathscr{F}(r) = F(r) + L^2/mr^3 = m\ddot{r} \qquad (5)$$

When Eq. 2 is written in the form shown in Eq. 5, one obtains an expression in the form of Newton's Second Law, namely, $$f = ma \qquad (6)$$

Here $\mathscr{F}(r)$ may be considered to be the effective force acting on the electron. $F(r)$ is the electrical force acting on the electron and $L^2/(mr^2)$ is the so-called "centrifugal force" term. The right side of Eq. 5 is the mass times the $r$ component of the acceleration.

Figure 9:
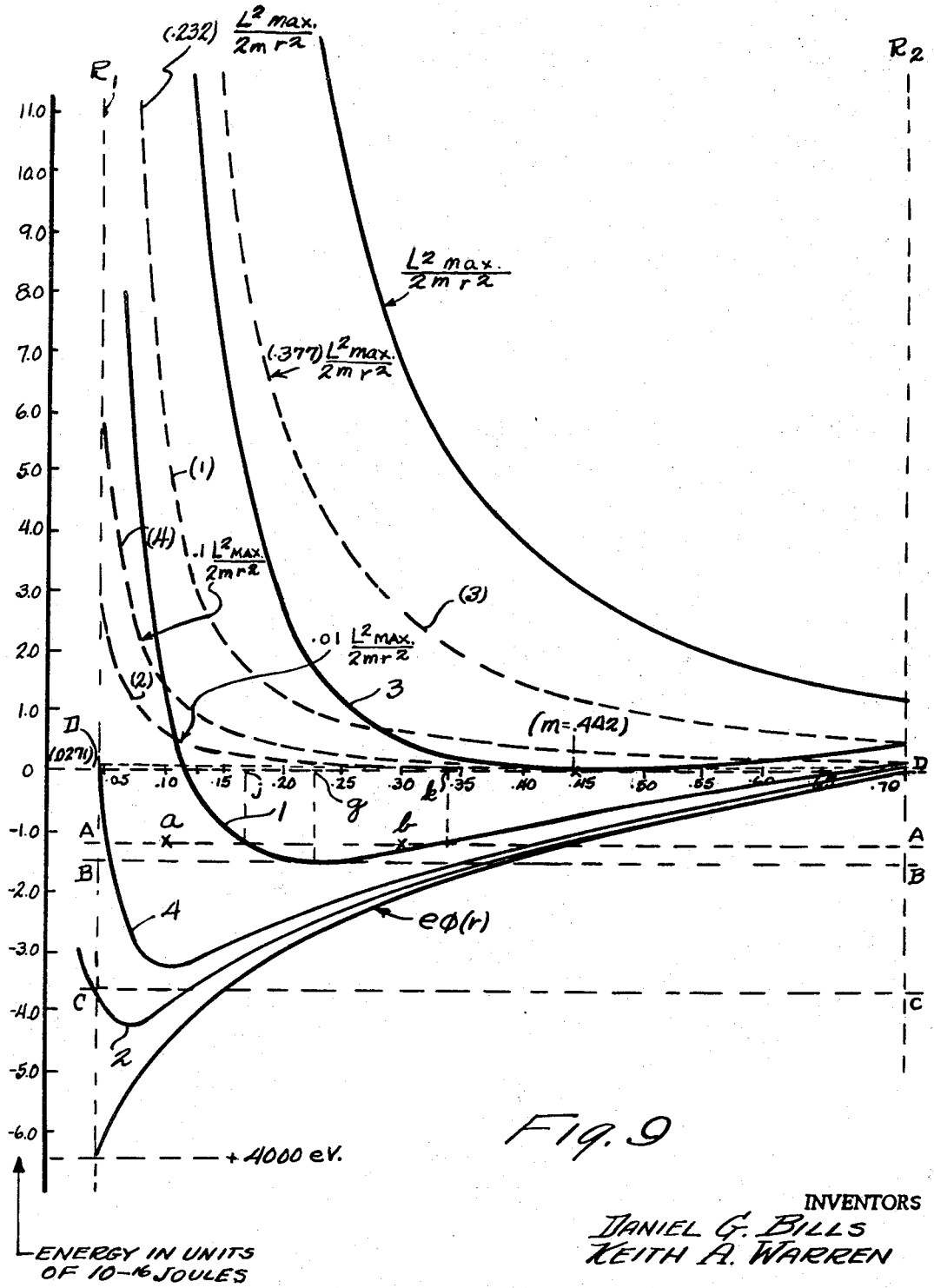
FIGURE 9 is a graph illustrative of the total energy and of various energy components of trapped electrons employed in the invention.

It is useful to consider the effective potential energy $$\Phi(r) = -\int \mathscr{F}(r) dr \qquad (7)$$

in examining the electron motion. In FIGURE 9 the electrical potential energy $-e\varphi(r)$, of an electron in the diode of FIGURE 7 is shown for an anode potential of 4000 volts with respect to the cathode, an anode radius, $R_1$, of .0469 inch, and a cathode radius, $R_2$, of .720 inch, these specific values being employed for the purpose of illustration only.

If one chooses $\varphi(R_2) = 0$
$\varphi(R_1) = V_a$
$\Phi(R_2) = L^2/2mR_2^2$ then it is easy to show that $$\Phi(r) = e\varphi(r) + L^2/2mr^2$$

Here if the equation is to be applied to an electron, $e$ is negative. Thus $L^2/2mr^2$ is the fictitious potential energy produced by the fictitious centrifugal force term $L^2/mr^3$. In the claims, this will be referred to as the "centrifugal" energy component of the total potential energy.

FIGURE 9 shows a plot of $e\varphi(r)$, the electrical potential energy for an electron between the anode and cathode as well as a plot of the $L^2/2mr^2$ term for an electron with the maximum possible angular momentum. Four additional $L^2/2mr^2$ curves (1)–(4) are shown, which are for terms which are various fractions of the maximum possible value for the term at any $r$.

When the $e\varphi(r)$ term is added algebraically to the $L^2/2mr^2$ term, the result is the effective potential energy $\Phi(r)$ of an electron with the designated angular momentum. That is, curves 1–4 correspond to the effective potential energy $\Phi(r)$ which result after adding curves (1)–(4) respectively to the $+e\varphi(r)$ curve.

Figure 8:
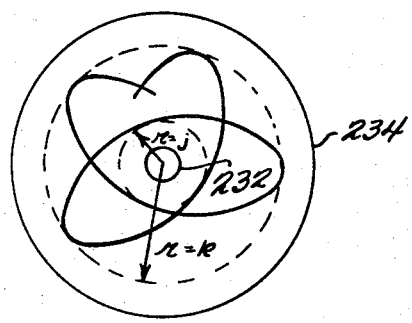
FIGURE 8 is an illustration of a typical rosette path that trapped electrons follow in the invention.

Consider an electron with an angular momentum about the anode corresponding to curve 1 of FIGURE 9. This curve is one of an infinite number of possible potential wells corresponding to different values of angular momenta. If this particular electron has a total energy corresponding to the level A—A, it will have turning points $r=j$ and $r=k$ as shown in FIGURE 8 and FIGURE 9. Because these turning points are at a radius greater than the anode radius and less than the cathode radius, the electron will orbit if it has a total energy of A—A. If this same electron has a total energy corresponding to the level B—B in FIGURE 9, the turning points coincide and the orbit is circular and of radius $r=g$. Note that such an electron orbit can only be produced when the electron injector is located at $r=g$. For lower energies than B—B it is impossible for the electron to acquire the angular momentum corresponding to curve 1 of FIGURE 9. However, an angular momentum corresponding to curve 4 of FIGURE 9 is consistent with a total energy B—B. For an angular momentum corresponding to curve 2 and a total energy corresponding to level C—C, an electron will not orbit for the inner turning point is at a smaller radius than the anode radius. This also applies to energy levels greater than C—C.

Thus it is evident that only certain orbits, and therefore certain regions of the diode, are accessible to the electron depending upon its total energy and angular momentum. If, as in the Gabor device (U.S. Patent 3,118,077), all the electrons were given a total energy corresponding to A—A and an angular momentum corresponding to curve 1 of FIGURE 9, there would be no electrons at $r<j$ and $r>k$ except for slight space charge spreading effects. Further only the orbit shown in FIGURE 8 would occur within the area defined by $r \geq j$ and $r \leq k$. It is evident that additional electrons could be made to orbit in these excluded regions with a proper choice of total energy and range of angular momenta. The determination of this choice is the purpose of the following discussion.

Note that in FIGURE 9 an electron with total energy corresponding to the level A—A cannot acquire the angular momentum corresponding to curve 1 unless it is injected at some radius between $r=j$ and $r=k$. If it is injected outside these limits, the kinetic energy of this electron must be negative and its velocity must be an imaginary number. Thus all angular momenta corresponding to curve 1 or to curves lying above curve 1 are forbidden to an electron injected at $r=0.40$ inch with energy corresponding to A—A. It is evident that to make more orbits and therefore more of the volume of the diode accessible to the electrons, the total energy of the electrons should be increased. As the total energy is increased above the level A—A the outer turning point moves toward larger $r$ because of the flatness of the $+e\varphi(r)$ curve in the vicinity of the cathode. Thus more of the volume of the diode becomes accessible to the orbiting electrons.

It is evident that the total energy can be increased up to the level D—D before some electrons with small angular momenta can strike the cathode. Level D—D is at the level where curve 4, the total potential energy curve corresponding to the lowest angular momentum an electron can have and still orbit for a potential difference of 4000 volts, intersects the cathode and the anode. If the energy is increased slightly above level D—D, some electrons previously trapped will be able to reach the anode or cathode. In an actual test, increasing the energy slightly above level D—D by only $.453 \times 10^{-16}$ joules (see FIGURE 9) caused the total electron path length to decrease by five times. Electrons with energy D—D and the angular momenta less than that corresponding to curve 4 will strike the anode or cathode and therefore will not orbit.

Electrons with energy D—D cannot acquire more angular momentum than that corresponding to curve 3. This corresponds to the prior statement that electrons emitted with energy B—B cannot acquire more angular momentum than that defined by curve 1. Further, the electrons with energy B—B can only obtain the angular momentum corresponding to curve 1 when they are emitted at $r=g$, the point where the minimum of curve 1 intersects the energy level B—B. Thus, the greatest angular momentum that can be acquired by an electron with energy D—D corresponds to that $L^2/2mr^2$ curve which has a minimum which intersects the energy level D—D, that is, curve 3, the intersection point being $r=m$. All other $L^2/2mr^2$ curves corresponding to a smaller angular momentum than curve 3 will have minimums below the D—D energy level. Thus, they will intersect the D—D energy level two times thereby resulting in rosette patterns similar to that shown in FIGURE 8 as long as the angular momentum is not less than that corresponding to curve 4, as explained before.

The minimums of the $L^2/2mr^2$ curves having angular momentums less than that corresponding to curve 3 will be to the left of the point $r=m$ or closer to the anode. This means that the maximum number of different orbits are available when the electron injector is placed at $r=m$. This follows by noting that if the electrons are injected by an injector located at $r=0.10$ inch and injected with total potential energy A—A (corresponding to point $a$), the orbit defined by curve 4 is available to such electrons, but the orbit defined by curve 1 is not available to these electrons since point $a$ is outside of the turning points of curve 1. Only when the number of orbits that can occur within the space between the anode and cathode are maximized is the ionizing ability of the injected electrons maximized. Thus, by the mere expedient of shifting the location of the electron injector away from point $a$ to point $b$ in FIGURE 9, more orbits are obtained. Thus when electrons are injected from an injector located at $R=0.3$ inch with energy A—A, the orbits available from both curves 1 and 4 are available to the injected electrons. Since the minimums of $L^2/2mr^2$ curves are located an increasing distance from the anode with increasing angular momentum it can now be seen that the shifting of the electron injector location away from the anode results in an increasing number of available orbits. As stated above, the maximum distance that the electron injector location can be shifted away from the anode is determined by $r=m$ which has been defined above.

From the foregoing analysis it is apparent that to maximize the total electron path, electrons should be injected with a total potential energy corresponding to the level D—D in FIGURE 9, at a radial distance $r=m$, with a maximum angular momentum corresponding to curve 3 and a minimum angular momentum corresponding to curve 4.

In a practical electron orbiting device, the electrical potential energy curve, $+e\varphi(r)$, will be flattened more near the cathode than is the theoretical curve shown in FIGURE 9 which ignores space charge effects and end effects. However, the analysis carried out above is in no way affected. All the potential energy curves are simply moved upward by the amount the $+e\varphi(r)$ curve is moved upward.

To apply the above analysis in a practical device the electrons are injected at $r=m$ as determined from FIGURE 9 for the ideal case with total energy corresponding to the level D—D with a maximum angular momentum corresponding to curve 3 and minimum angular momentum corresponding to curve 4. With the diode saturated with space charge, the actual shape of the $+e\varphi(r)$ curve is experimentally determined using certain well known techniques such as electron beam or Langmuir probes (the shape of the $+e\varphi(r)$ curve is not strongly dependent on the exact radial position of the filament so long as the diode volume is space charge limited). Once the shape of the $+e\varphi(r)$ curve is obtained, the potential well curves can be calculated exactly as described above and the injection radius $r=m$ determined from the position of the minimum of curve 3.

Since the energy level D—D corresponds to $0.0271 \times 10^{-16}$ joules (which is greatly exaggerated in FIGURE 9), practical economies are achieved by operating the filament at a total electron energy corresponding to the level O—O, which corresponds to ground potential. This is equivalent to grounding both the filament and the cathode and eliminates the need for a separate power supply to bias the filament. The optimum electron injection radius, $r=m$, would be determined from the position of the minimum in the potential well curve whose minimum is at the O—O level. The electron injection devices shown in FIGURES 5 and 6 will impart to the emitted electrons the range of angular momenta defined between curves 3 and 4.

Figure 10:
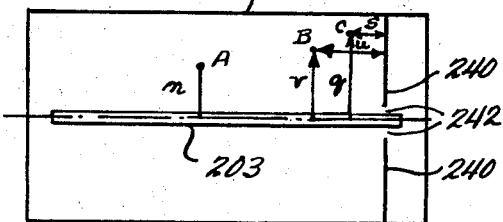
FIGURE 10 is a diagrammatic representation of a side view of the embodiment of this invention illustrated in FIGURE 7.

Having established the criteria for the optimum radial location of the emitter, the optimum axial location of the emitter will now be discussed. FIGURE 10 diagrammatically illustrates a side view of a diode device having a cathode 202, an anode 203, and an anode shield 240, which may be an annular ring disposed around the anode 203, which is preferably maintained at the potential of the cathode. This shield may also comprise a solid disc disposed at the end of the anode. The primary purpose of the shield is to maintain a symmetric electric field at the ends of the diode device in spite of the large number of electrical terminals and mounting members disposed at the end of the device which tend to distort the field. This shield also serves to reflect the electrons orbiting within the diode device.

Assume the optimum location for an emitter located in the central portion (radial field only) of the diode device is shown at point A, this optimum location having been determined by the steps outlined hereinbefore. Near the ends of the diode device an axial field also exists. However, the same steps may be applied to determine the optimum radial distance of the emitter from the anode for a given distance from the end of shield 240. Thus, there is no optimum axial distance from shield 240 for all radial distances from the anode 203. Rather, for each distance from the shield 240, where a component of axial electric field exists, there is a corresponding optimum radial distance from the anode for locating the emitter. Thus, after the $+e\varphi(r)$ curve is established for a given axial distance from the anode 240, the optimum radial distance can be determined by following the steps outlined hereinbefore.

At points sufficiently removed from the shield 240 where there is no axial component of the electric field (such as point A), the optimum radial distance remains constant with variations in axial distance from the anode shield. However, when the axial distance is $u$ as shown in FIGURE 10, the optium radial distance $v$ is greater than $n$ of point A since the equipotential lines tend to slope inwardly through the gap 242 between anode 203 and shield 240. As the axial distance decreases to $s$, the optimum radial distance increases to $q$, as shown in FIGURE 10, the change in distance between $v$ and $q$ being exaggerated for the purpose of illustration.

If no shield 240 were present at the end of the diode device, the steps outlined hereinbefore would still be applicable in determining the optimum location of the emitter. That is, after determining the shape of the $+e\varphi(r)$ curve at a given distance from the end of the diode device, regardless of the relative proportion of the axial and radial electrical fields at this distance, the optimum radial distance of the emitter from the anode can be established.

Although the steps for determining the optimum radial distance have been described for diode devices hereinbefore, these steps are also applicable to triode devices—that is, having determined the $+e\varphi(r)$ curve between the anode 203 and the grid 204 of FIGURE 1, at a given point along the axis of the anode 203, these steps can be applied to determine the optimum radial distance.

Reference should now be made to FIGURE 3 which is a modified embodiment of the invention employed as an ionization vacuum gauge.

For ionization gauge use, several additional requirements must be met which are not so important in ion pumps. Obviously it is undesirable for a gauge to pump the gas whose pressure it is intended to measure. Thus sublimation devices are purposely omitted.

Another vital requirement is that the measured ion current be strictly proportional to the pressure. It has been noted that electron space charge oscillations can cause the measured ion current to be non-proportional to pressure in diode devices and how this can be overcome by the use of triode devices.

Another source of non-proportionality which is troublesome in ionization gauges at very low pressures is the so-called X-ray effect. Energetic electrons which strike the anode cause soft X-rays to be emitted. When these soft X-rays impinge on the cathode, photoelectrons are ejected from the cathode and travel to more positive electrodes. In the external measuring circuit (not shown), these electrons leaving the cathode cannot be distinguished from ions arriving at the cathode. Thus a current which is independent of pressure is superimposed on a pressure dependent current producing a measured curent which is not proportional to the pressure at low pressures. If a tetrode structure employs a supprlessor grid 212 as in FIGURE 3, the X-ray effect can be substantially reduced. Here the grid or further electrode 208 and ion collector or cathode or outer electrode 202 are preferably held at ground potential. The suppressor grid 212 is preferably held negative with respect to ground. The anode 214 is preferably held at positive potential of about 200 volts above ground. The filament 216 is preferably run at the potential of the grid electrode 208.

Electrons emitted from the filament orbit about the anode as described hereinbefore. Ions formed when the electrons collide with gas molecules are accelerated outward from the anode. A few are collected by the grid 208, a few are collected by the suppressor grid 212, but most are collected by the ion collector 202. If soft X-rays strike the ion collector the photoelectrons ejected are repelled by the suppressor grid and immediately return to the ion collector. Photoelectrons ejected from the inner surfaces of the suppressor grid travel radially inward to the grid or anode. Photoelectrons ejected from the grid travel inward to the anode. Only if photoelectrons fall on the outer surfaces of the suppressor, a highly improbable event, will they be able to travel to the ion collector. Thus the ion collector 202 receives only ions and the current to it is a true measure of the pressure in the tube.

Figure 4:
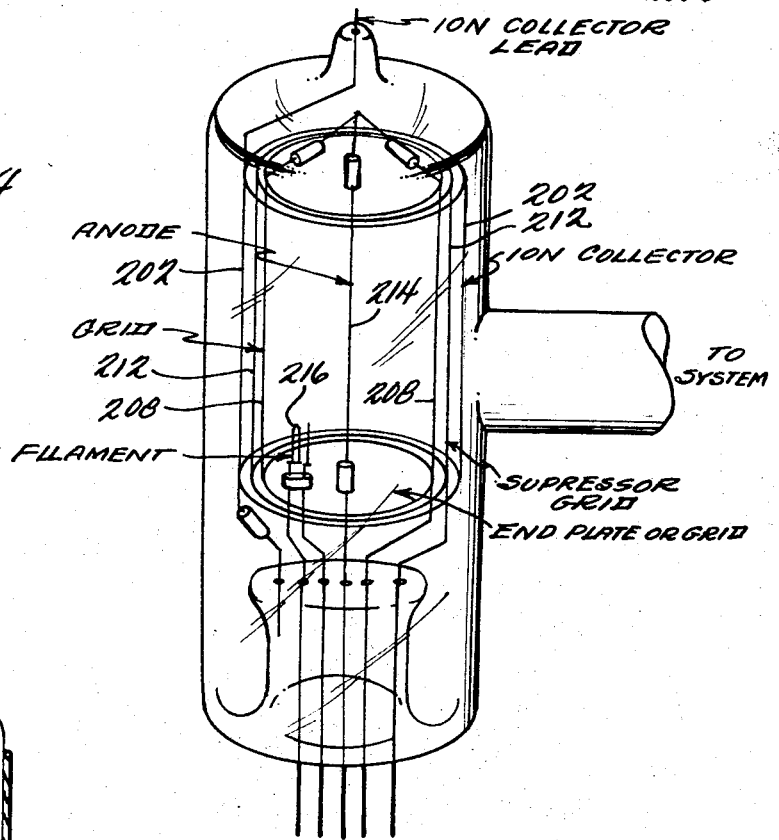
FIGURE 4 is a diagrammatic representation of an ion vacuum gauge tube employing a modified tetrode embodiment of the invention.

A typical ion gauge tube using tetrode approach is shown in FIGURE 4.

Having thus described the several useful and novel features of the ion-pumping apparatus of the instant invention, it will become immediately apparent that the several worthwhile objectives for which they were developed have been achieved. Although but a few specific embodiments of the invention have been illustrated and described herein, it is realized that other configurations are likely to occur to those skilled in the art within the broad teaching hereof, hence, it is intended that the scope of protection afforded hereby shall be limited only insofar as said limitations are expressly set forth in the appended claims.

What is claimed is:
1. In a vacuum device, the improvement comprising:
   a hollow substantially cylindrical electrical conductor defining an outer electrode;
   a plurality of hollow substantially cylindrical further electrodes disposed within said outer electrode and around the axis of said outer electrode; each of said further electrodes having an open structure to permit the passage of ions therethrough;
   a plurality of elongate electrical conductors respectively disposed along the axes of said plurality of further electrodes;
   means for respectively injecting charged particles into the regions between said further electrodes and said elongate conductors, said charged particles being attracted to said elongate conductors and being injected with insufficient energy to reach the further electrodes and with sufficient angular momentum such that a majority thereof cannot reach the elongate conductors; and
   means for symmetrically distributing gettering material on the inner wall of said outer electrode;
   said improvement facilitating the pumping of inactive gases due to the symmetrical distribution of the gettering material and the plurality of cell structures, where each cell comprises a said further electrode and an elongate conductor to ionize gas.

2. Apparatus, as in claim 1 where said sublimation means is disposed and extends along the axis of said outer electrode thereby facilitating the pumping of inert gases.

3. Apparatus, as in claim 2, where said sublimating means is a conduction heated sublimator and where the region around the axis of said outer electrode is maintained at a low potential with respect to said outer electrode.

4. Apparatus, as in claim 1, where each of said cells are disposed an equal radial distance from the axis of said outer electrode and an equal angular distance from each other around the axis of said outer electrode thereby creating a low potential region at said last-mentioned axis with respect to said outer electrode.

5. Apparatus, as in claim 4, where said means for sublimating a gettering material onto the inside surface of said outer electrode is disposed in said low potential region.

6. In a vacuum device, the improvement comprising:
   a hollow substantially cylindrical electrical conductor defining an outer electrode;
   a plurality of hollow substantially cylindrical further electrodes disposed within said outer electrode and around the axis of said outer electrode, each of said further electrodes having an open structure to permit the passage of ions therethrough;
   a plurality of elongate electrical conductors respectively disposed along the axes of said plurality of further electrodes; and
   means for respectively injecting charged particles into the regions where electrostatic fields exist between said further electrodes and said elongate conductors, said charged particles being attracted to said elongate electrodes;
   said charged particles being injected into said regions:
      (1) with a minimum angular momentum which corresponds to a first mathematical expression for the effective potential energy of the charged particles which first expression has the same value when evaluated at a radius equal to the radius of said elongate conductors as said first expression has when evaluated at a radius equal to the radius of said further electrodes;
      (2) with a total energy equal in value to the value of said first mathematical expression for the effective potential energy of the charged particles evaluated at a radius equal to the radius of said elongate conductors;
      (3) with a maximum angular momentum corresponding to a second mathematical expression for the effective potential energy of the charged particles which second expression has a minimum value equal in value to said first expression when said first expression is evaluated at a radius equal to the radius of said elongate conductors; and
      (4) at radial distances respectively from said elongate conductors equal to the radial distances from said elongate conductors at which said minimum value occurs in said second mathematical expression.

7. In a vacuum device, the improvement comprising:
a hollow substantially cylindrical electrical conductor defining an outer electrode;
an elongate electrical conductor disposed along the axis of said outer electrode;
means for injecting charged particles into an electrostatic field existing between the outer electrode and the elongate conductor, said charged particles being attracted towards the elongate conductor;
said charged particles being injected into said electrostatic field at a point where a substantial axial component of the said field exists; and
said charged particles being injected into said region:
  (1) with a minimum angular momentum which corresponds to a first mathematical expression for the effective potential energy of the charged particles which first expression has the same value when evaluated at a radius equal to the radius of said elongate conductor as said first expression has when evaluated at a radius equal to the radius of said outer electrode;
  (2) with a total energy equal in value to the value of the said first mathematical expression for the effective potential energy of the charged particles evaluated at a radius equal to the radius of said elongate conductor;
  (3) with a maximum angular momentum corresponding to a second mathematical expression for the effective potential energy of the charged particles which second expression has a minimum value equal in value to said first expression when said first expression is evaluated at a radius equal to the radius of said elongate conductor; and
  (4) at a radial distance from said elongate conductor equal to the radial distance from said elongate conductor at which said minimum value occurs in said second mathematical expression.

8. Apparatus, as in claim 7, where the potential of said charged particle injection means with respect to said elongate conductor is the same as that of said outer electrode with respect to the elongate conductor.

9. Apparatus, as in claim 8, where said potential is ground.

10. In a vacuum device, the improvement comprising:
a hollow substantially cylindrical electrical conductor defining an outer electrode;
a plurality of hollow substantially cylindrical further electrodes disposed within said outer electrode and around the axis of said outer electrode, each of said further electrodes having an open structure to permit the passage of ions therethrough;
a plurality of elongate electrical conductors respectively disposed along the axes of said plurality of further electrodes; and
means for respectively injecting electrons into the regions where electrostatic fields exist between said further electrodes and said elongate conductors, each of said electron injection means including an approximately hairpin shaped planar strip of electrically conducting material having a surface area in one direction defined by the outwardly drawn normal to said surface area which is substantially larger than the surface area in a direction approximately perpendicular to said one direction; said one direction being directed in the $\theta$ direction of said electrostatic field and thereby causing most of the electrons to be emitted approximately in said $\theta$ direction, a negligible amount of electrons being emitted to said elongate conductor from said surface area in a direction perpendicular to said one direction;
said electrons being attracted to said elongate conductors and being injected with insufficient energy to reach the further electrodes and with sufficient angular momentum such that a majority thereof cannot reach the elongate conductors.

11. In a vacuum device, the improvement comprising:
a hollow substantially cylindrical electrical conductor defining an outer electrode;
an elongate conductor disposed along the axis of said outer electrode;
means for injecting electrons into an electrostatic field existing between the outer electrode and the elongate conductor, said electrons being attracted towards the elongate conductor, said electron injection means including an approximately planar hairpin-shaped strip of electrically conducting material having a surface area in one direction defined by the outwardly drawn normal to said surface area which is substantially larger than the surface area in a direction approximately perpendicular to said one direction; said one direction being directed in the $\theta$ direction of said electrostatic field and thereby causing most of the electrons to be emitted approximately in said $\theta$ direction, a negligible amount of electrons being emitted to said elongate conductor from said surface area in a direction perpendicular to said one direction;
said electrons being injected into said electrostatic field at a point where a substantial axial component of the said field exists; and
said electrons having sufficient angular momentum such that a substantial majority thereof cannot reach the elongate conductor and insufficient energy to reach the outer electrode after said charged particles leave the area where a substantial axial component of the field exist and enter that part of the field which has substantially only radial components.

12. Apparatus, as in claim 11, where said electron injection means is formed by etching from a sheet of metal.

13. An electron injection device comprising:
an approximately hairpin-shaped strip of electrically conducting material having a surface area in one direction defined by the outwardly drawn normal to said surface area which is substantially larger than the surface area in a direction perpendicular to said one direction;
said electron injection means being formed by etching from a sheet of metal.

14. In a vacuum device, the improvement comprising:
a hollow substantially cylindrical electrical conductor defining an outer electrode;
a plurality of hollow substantially cylindrical further electrodes disposed within said outer electrode and around the axis of said outer electrode, each of said further electrodes having an open structure to permit the passage of ions therethrough;
a plurality of elongate electrical conductors respectively disposed along the axes of said plurality of further electrodes; and
means for respectively injecting electrons into the regions where an electrostatic field exists between said further electrodes and said elongate conductors, each of said electron injection means including:
a ribbon of metal having an approximate hairpin shape and a coating of material disposed on the outer surfaces of said ribbon, the edges of said ribbon being bare; said material having a low work-function when compared to the metal ribbon; said low work-function surfaces facing in the $\theta$ direction in said electrostatic field, most of the electrons emitted from said injector being projected into the $\theta$ direction approximately through said low work-function material; a negligible number of electrons being emitted from the edges of said ribbon to the corresponding elongate conductor;

said electrons being attracted to said elongate conductors and being injected with insufficient energy to reach the further electrodes and with sufficient angular momentum such that a majority thereof cannot reach the elongate conductors.

15. In a vacuum device, the improvement comprising:
a hollow substantially cylindrical electrical conductor defining an outer electrode;
an elongate conductor disposed along the axis of said outer electrode;
means for injecting electrons into an electrostatic field existing between the outer electrodes and the elongate conductor, said electrons being attracted towards the elongate conductor, said electron injection means including: a ribbon of metal having an approximate hairpin shape and a coating of material disposed on the outer surfaces of said ribbon, the edges of said ribbon being bare, said material having a low work-function when compared to the metal ribbon; said low work-function surfaces facing in the $\theta$ direction in said electrostatic field, most of the electrons emitted from said injector being projected into the $\theta$ direction approximately through said low work-function material; a negligible number of electrons being emitted from the edges of said ribbon to said elongate conductor;
said electrons being injected into said electrostatic field at a point where a substantial axial component of the said field exists; and
said electrons having sufficient angular momentum such that a substantial majority thereof cannot reach the elongate conductor and insufficient energy to reach the outer electrode after said charged particles leave the area where a substantial axial component of the field exist and enter that part of the field which has substantially only radial components.

16. Apparatus, as in claim 15, including support rods connected to the ends of said hairpin-shaped ribbon, said low work-function coating of material extending along the length of said outer surfaces to respective points which are substantially removed from said support rods thereby effectively removing said support rods from the electron emission region surrounding said low work-function surfaces.

17. Apparatus, as in claim 15, where said electron injection means includes an electrical insulator disposed between the parallel legs of the hairpin-shaped ribbon.

18. Apparatus, as in claim 15, where the cross-section of said electron injection means is approximately .006 inch by .006 inch.

19. An electron injection device comprising:
a ribbon of metal having an approximate hairpin shape; and
a coating of material disposed on the outer surfaces of said ribbon, the edges of said ribbon being bare; said material having a low work-function when compared to the metal ribbon;
most of the electrons being emitted from said injector through said low work-function material;
a negligible number of electrons being emitted from the edges of said ribbon.

20. Apparatus, as in claim 1, where said further electrodes are disposed parallel to the axis of said outer electrode.

21. Apparatus, as in claim 1, where said cells are so disposed around the axis of said outer electrode to establish a low potential region at said last-mentioned axis with respect to said outer electrode and where said means for sublimating a gettering material onto the inside surface of said outer electrode is disposed in said low potential region.

References Cited

UNITED STATES PATENTS

| 3,001,128 | 9/1961 | Nottingham | 324—33 |
| 3,244,969 | 4/1966 | Herb et al. | 324—33 |

ROBERT M. WALKER, *Primary Examiner.*